United States Patent [19]

Blaine

[11] Patent Number: 5,503,478
[45] Date of Patent: Apr. 2, 1996

[54] LUBRICANT DISTRIBUTION SYSTEM FOR BEARINGS AND BUSHINGS

[75] Inventor: Brad L. Blaine, Grosse Pointe Woods, Mich.

[73] Assignee: Federal-Mogul Corporation, Southfield, Mich.

[21] Appl. No.: 415,277

[22] Filed: Apr. 3, 1995

[51] Int. Cl.$^6$ ................................................ F16C 32/06
[52] U.S. Cl. ........................... 384/100; 384/118; 384/286
[58] Field of Search ................................. 384/100, 114, 384/118, 119, 120, 286, 291

[56] References Cited

U.S. PATENT DOCUMENTS

| | | | |
|---|---|---|---|
| 1,236,511 | 8/1917 | Waring | 384/291 |
| 1,377,866 | 5/1921 | White | 384/291 |
| 1,842,081 | 1/1932 | Durdin, Jr. | 384/142 |
| 1,852,579 | 5/1932 | Johnson | 384/291 |
| 2,631,905 | 3/1953 | Coppen | 384/291 |
| 2,660,484 | 11/1953 | Gerard et al. | 384/118 |
| 2,760,832 | 8/1956 | Bidwell | 384/116 |
| 3,132,906 | 5/1964 | Sternlicht | 384/114 |
| 3,300,259 | 1/1967 | Howard | 384/291 |
| 3,321,254 | 5/1967 | Dock | 384/114 |
| 3,357,759 | 12/1967 | Stephenson | 384/118 |
| 3,386,783 | 6/1968 | Scheufler | 384/291 |
| 3,454,311 | 7/1969 | Tomita et al. | 384/118 |
| 3,680,932 | 8/1972 | Raimondi | 384/291 |
| 3,899,224 | 8/1975 | Schuller et al. | 384/103 |
| 4,090,748 | 5/1978 | Sugimoto et al. | 384/291 |
| 4,567,815 | 2/1986 | Kocher | 384/291 X |
| 4,602,873 | 7/1986 | Izumi et al. | 384/99 |
| 4,696,585 | 9/1987 | Swearingen | 384/399 |
| 4,747,705 | 5/1988 | Agrawal | 384/118 |
| 4,772,137 | 9/1988 | Salter, Jr. et al. | 384/120 |
| 4,834,559 | 5/1989 | Kalvoda | 384/118 |
| 4,989,997 | 2/1991 | Yoshimura | 384/118 X |
| 5,000,584 | 3/1991 | Simmons | 384/118 |
| 5,009,522 | 4/1991 | Hahn | 384/288 |
| 5,181,783 | 1/1993 | Sherman et al. | 384/114 |
| 5,192,136 | 3/1993 | Thompson et al. | 384/123 |
| 5,363,557 | 11/1994 | Thompson et al. | 29/898.041 |

Primary Examiner—Thomas R. Hannon
Attorney, Agent, or Firm—Lawrence J. Shurupoff

[57] ABSTRACT

A shaft bearing or bushing includes a hydrodynamic wedge film lubricant pumping surface along one edge region and an essentially continuous cylindrical land surface along the other opposed edge region. Lubricant moves circumferentially along the pumping surface and axially along the continuous land surface. The bearing provides extensive surface area oil film support for the rotating shaft and may be optimized for supporting a specific shaft load distribution.

8 Claims, 3 Drawing Sheets

LUBRICANT DISTRIBUTION SYSTEM FOR BEARINGS AND BUSHINGS

BACKGROUND OF THE INVENTION

1. Field of the Invention

The present invention relates to a plain bearing or bushing having both a ramped and a cylindrical surface profile for distributing lubricating fluid to load-bearing surfaces under both hydrodynamic wedge film lubrication and conventional cylindrical film lubrication.

2. Description of Prior Developments

Rotational motion of a shaft is commonly used to maintain a load supporting lubricant film between annular support surfaces provided on the inner surfaces of bearings and bushings, (hereinafter collectively referred to as bushings) and the outer surface of the shaft. Rotation of the cylindrical shaft draws lubricant into one or more small clearance spaces between the shaft and the load bearing surfaces of the bushing.

The internal support surfaces of the bushing may include a fluid entrance surface spaced radially from the shaft side surface, a land surface having a minimal clearance with respect to the shaft surface and a concave ramp surface joining the fluid entrance surface and the land surface. Lubricating oil is drawn in a circumferential direction from the fluid entrance surface along the ramp surface and onto the land surface.

The oil is wedged into a small radial clearance between the land surface and the shaft side surface to form a pressurized load supporting film. The pressurized wedge-shaped oil film is not readily displaced out of the small clearance space, and is thus able to absorb or sustain relatively large radial shaft loads. This type of bearing lubrication is sometimes referred to as hydrodynamic wedge film lubrication.

Although hydrodynamic wedge film lubrication provides satisfactory results when used in many conventional bearing and bushing applications, the presence of ramped bearing surfaces over the full axial extent of the bearing or bushing decreases the stability provided to a rotating shaft as compared to a nonramped or nominally cylindrical bearing support surface. Moreover, such a ramped design produces a larger leak path for lubricant to escape from between the bearing and shaft.

U.S. Pat. No. 1,236,511 shows a bearing construction that utilizes wedge film lubrication of the above-mentioned type wherein oil is introduced to the bearing through four axially extending grooves in the bearing inner surface. As the shaft rotates, the oil clinging to the shaft surface is drawn circumferentially into small clearance spaces located midway between the grooves. The oil film established in the small clearance spaces provides a low friction support for the shaft, thereby protecting the shaft and bearing against contact and wear.

The circumferentially moving oil film is confined to circumferential motion by rims or lands that form shoulders along edge areas of the wedge film surfaces. A disadvantage of such rims is that if they are fully effective they can be in direct contact with the shaft surface, thereby producing frictional wear. Also, by confining the oil to a circumferential motion, any circulation of oil through the bearing is prevented because there is no convenient oil path out of the bearing. The oil will endlessly circulate in a circumferential direction around the bearing, thereby eventually heating the oil and generating carbon particulates.

Other patents showing wedge film lubrication achieved by circumferential oil motion are U.S. Pat. Nos. 2,631,905 and 3,680,932. In these patented arrangements, the edge areas of the wedge film surfaces are bounded by endless circular rim or land surfaces designed to prevent axial leakage of the circumferentially moving oil film away from the wedge film surfaces.

SUMMARY OF THE INVENTION

The present invention is directed to a radial bearing using wedge film lubrication together with a controlled axial flow of the wedge film oil through a cylindrical gap so that the oil circulates through the bearing in an expeditious manner.

The invention is primarily embodied in a sleeve bearing wherein approximately one-quarter to one-half the axial length of the bearing is internally ramped and contoured to form one or more wedge film pump surfaces designed to promote a circumferential flow of lubricant around the internal surface of the bearing. The remaining portion of the axial length of the bearing includes a cylindrical surface having a substantially uniform radial clearance relative to the shaft surface.

The lubricant moves circumferentially around the bearing while in contact with the wedge film surfaces and axially and/or helically while in contact with the cylindrical bearing surface. The cylindrical bearing surface establishes an essentially continuous load-supporting film around the shaft surface, thereby providing an essentially continuous uniform support action around the entire shaft circumference so as to stabilize the shaft. With the described arrangement, the unit loadings on the bearing are lessened as compared to a purely wedge-film bearing because the entire circumference of the bearing provides support to the shaft over a significant axial extent of the bearing.

The clearance between the cylindrical shaft surface and cylindrical bearing surface can be closely controlled by conventional machining or forming procedures so that the quantity of oil circulated through the bearing can be limited to a reasonable value consistent with the aim of controlling the thermodynamic effect.

By providing a hydrodynamic wedge effect over only a portion of the axial extent of the bushing or bearing, the bushing or bearing may be optimized to match its load handling capabilities with a particular shaft loading distribution while reducing lubricant leakage and improving shaft stability. That is, hydrodynamic ramps may be limited to that axial portion of the bearing which receives the greatest radial loads while the remaining axial extent of the bearing surface is of conventional circular or cylindrical shape for improving shaft stability and controlling or reducing axial lubricant flow and leakage.

Moreover, by providing a portion of the bearing with a full round cylindrical support surface, shaft support is increased so as to reduce stress concentrations and the breakdown of the lubricant film in the hydrodynamic wedge region, This in turn prevents metal-to-metal contact since the lubricant wedge is maintained.

Additional features and advantages of the invention will be further apparent from the attached drawings and drawing descriptions.

DETAILED DESCRIPTION OF THE PREFERRED EMBODIMENTS

Figure 1:
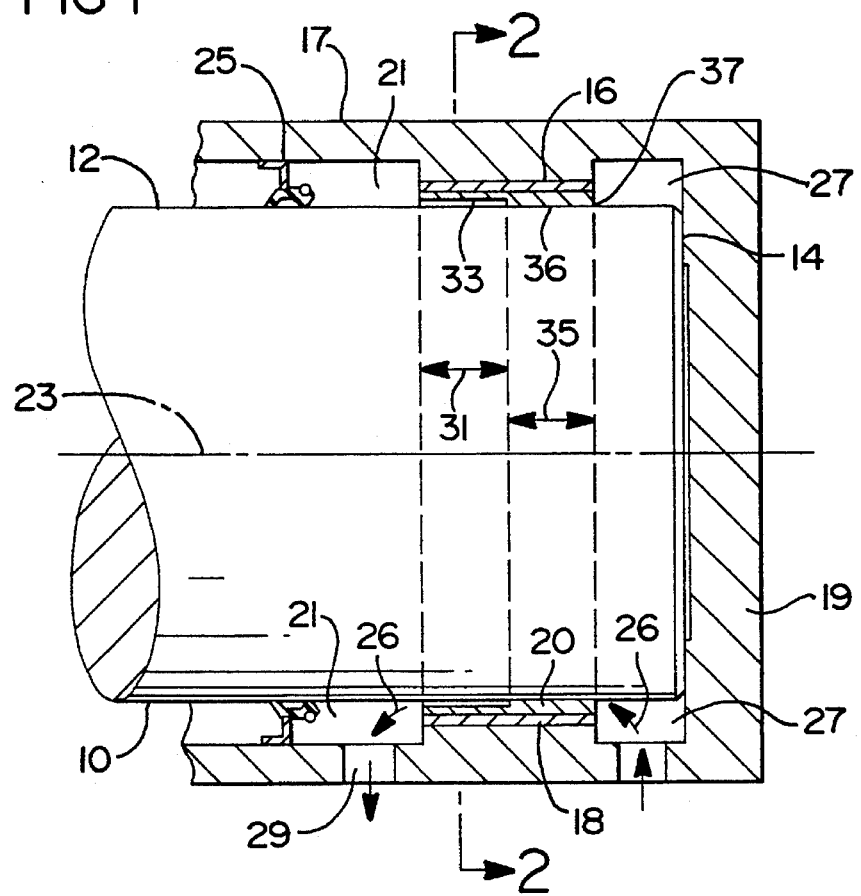
FIG. 1 is a fragmentary elevational view of a rotary shaft supported by a radial bearing or bushing constructed according to the invention.
Figure 2:
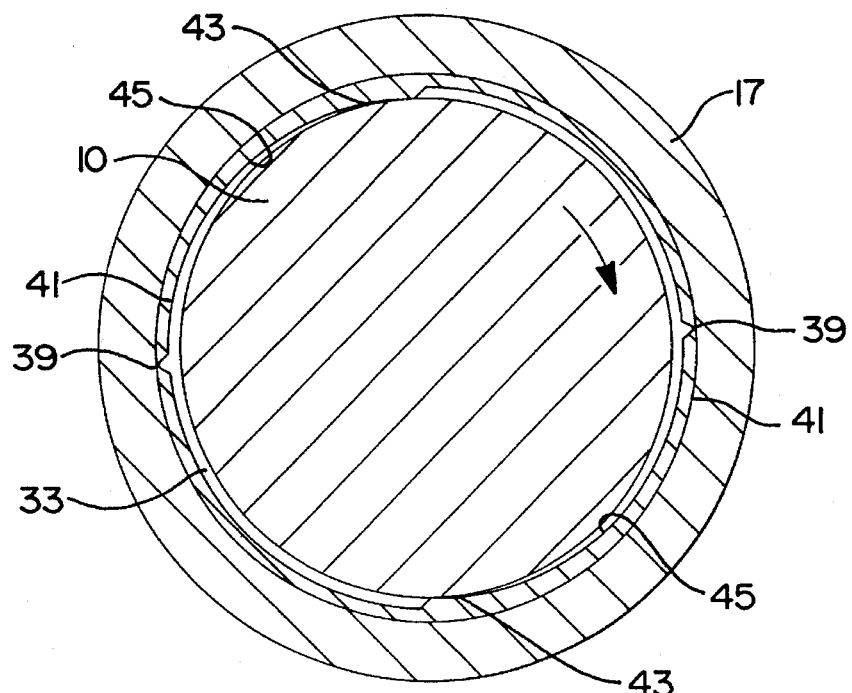
FIG. 2 is a transverse sectional view taken on line 2—2 in FIG. 1.

Referring to FIGS. 1 and 2, there is shown a shaft and bearing assembly constructed accordance with the present invention. A cylindrical or circular shaft 10 has a cylindrical surface 12 and a flat end surface 14. As shown in FIG. 1., the shaft is supported in the radial direction by a sleeve-type bearing or bushing 16 which is press fit in housing 17. End wall 19 of the housing is facially engaged with end surface 14 of the shaft to form an annular lubricant chamber 27 surrounding the shaft near its right end portion. The shaft is designed to rotate around the shaft axis 23.

Bushing 16 includes an outer annular steel backing layer or strip 18 laminated to an annular layer or inner strip 20 of a bearing alloy having anti-friction properties, e.g., an aluminum-tin, an aluminum-lead or other suitable bearing alloy. A flat bimetal strip is typically curled into a circular configuration to form an annular bushing.

A conventional annular radial lip seal 25 is press fit in housing 17 to form an annular lubricant chamber 21 bordering the left end edge portion of bushing 16. As indicated by the directional arrows, lubricating oil 26 is pumped into chamber 27 thereby pressurizing chamber 27. The pressurized lubricant has a circumferential and axial motion as it passes leftwardly through the clearance space between bushing 16 into the annular chamber 21. The oil 26 passes out of chamber 21 through an exit opening 29.

The left axial half portion of bushing 16 designated by numeral 31 is internally contoured to form a wedge film pump surface designated generally by numeral 33 in FIG. 2. This left portion of the bushing experiences the greatest deflection and loading. The right half portion of bushing 16 designated by numeral 35 in FIG. 1 has a cylindrical internal surface 36 having a uniform radial clearance relative to the shaft side surface 12. This right portion of the bushing experiences a lower load distribution than the left portion.

In FIG. 1, the uniform radial clearance is designated by numeral 37. Typically, clearance 37 is about 0.001 inch, whereby a relatively thin load supporting oil film is maintained in the clearance space while the oil is moving in a right-to-left direction as shown in FIG. 1.

Wedge film pump surface 33 includes two axial grooves 39 for supplying lubricating fluid to two fluid entrance surfaces 41 spaced radially outwardly from the cylindrical shaft surface 12. Pump surface 33 further includes two cylindrical portion land surfaces 43 that are coextensive or coplanar with cylindrical surface 36 constituting the right half of the bushing.

Land surfaces 43 promote shaft stability while maintaining the lubricant in a highly pressurized condition. An arcuate ramp surface 45 joins fluid entrance surface 41 to land surface 43. Although land surfaces 43 can be quite narrow and essentially define a line contact with the shaft, it is preferred to extend land surfaces 43 circumferentially over at least several degrees of arc, i.e. 2 to 5 degrees, so as to provide a portion of a cylindrical support surface which reduces shaft whip and promotes shaft stability.

As shaft 10 rotates in a clockwise direction as shown in FIG. 2, the circumferentially moving shaft surface draws oil along the ramp surface 45 to form a wedge type oil film on land surface 43. Simultaneously, the pressurized condition of lubricant chamber 27 tends to move the oil axially in a right-to-left direction across the cylindrical bushing surface 36 and onto the ramped region 31.

The oil is introduced onto the ramped region 36 primarily at or near the groove 39 and is distributed through the ramp of bushing surface 41 by the movement of cylindrical shaft surface 12. The oil is distributed uniformly on land surface 43 thereby increasing its load carrying capability. The oil on surfaces 36 and 43 provides the desired lubricant support for shaft 10. The system is designed to provide a continuous circulation of the oil through the bearing or bushing while the shaft is rotating.

By aligning and mounting the ramped portion 31 of the bushing adjacent that section of the shaft which produces the greatest unit loading, such as by shaft whip or other deflection, the bushing may be optimized for maximum loading performance. Since the ramped portion 31 can withstand greater dynamic loading than cylindrical portion 35, overall bearing performance may be increased. In addition, the cylindrical portion 35 provides greater stability than that normally possible with only the hydrodynamic portion 31, and thereby reduces the peak loading applied over portion 35.

The bushing performance can be even further optimized by circumferentially aligning the land surfaces 43 with that circumferential portion or portions of the shaft surface which experiences the greatest loading. For example, if it is known that the greatest radial loading on a particular shaft occurs at the 6 o'clock and 12 o'clock positions, the bushing would be aligned as shown in FIG. 2 such that land surfaces 43 are located adjacent the corresponding 6 o'clock and 12 o'clock circumferential locations.

Figure 3:
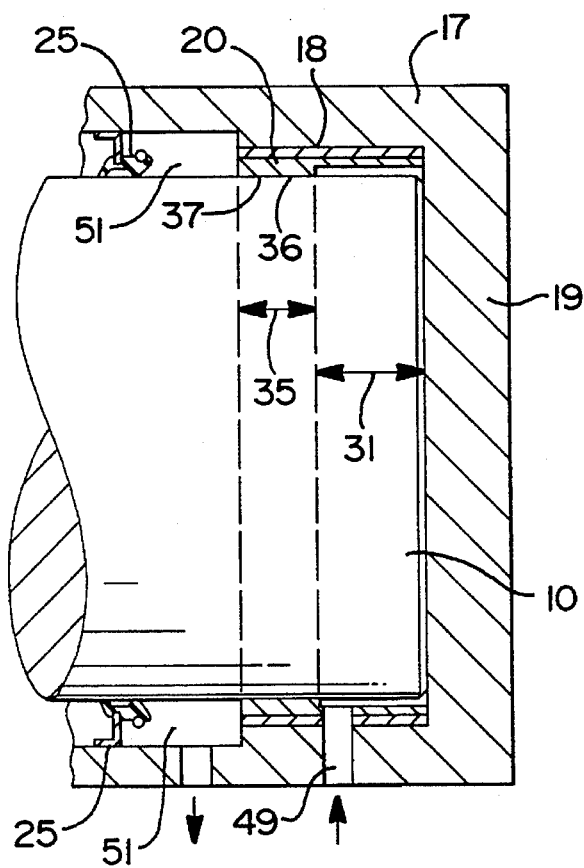
FIG. 3 is a fragmentary view taken in the same direction as FIG. 1, showing another embodiment of the invention.
Figures 4, 5:
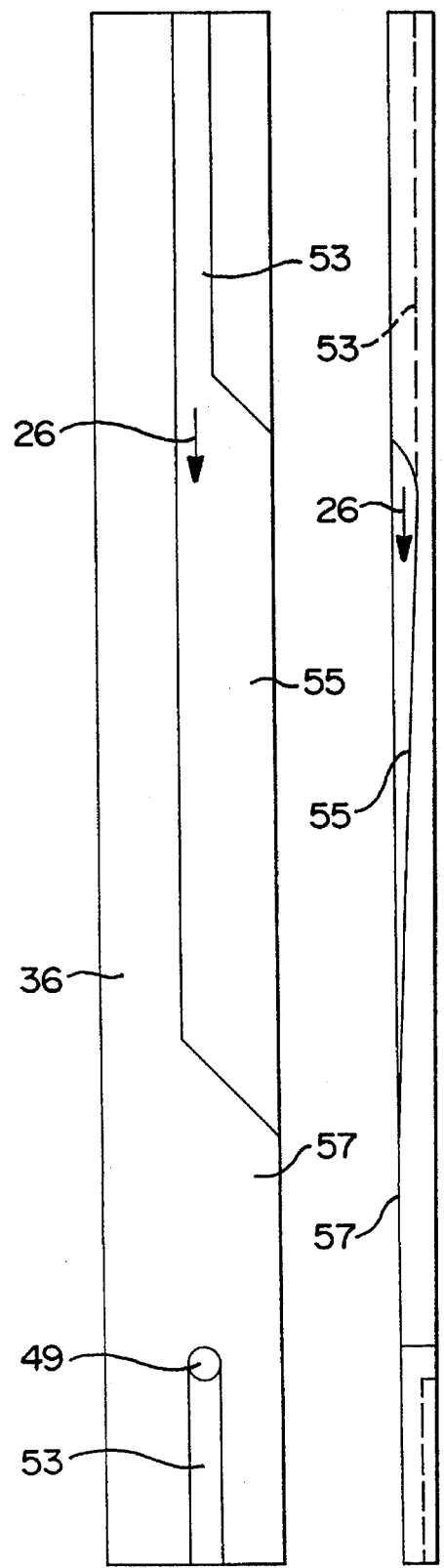
FIG. 4 is a plan view of FIG. 3, unfolded to a flat condition to illustrate the contour of the bearing surface.
FIG. 5 is an edge view of the unfolded bearing of FIG. 4.

FIGS. 3 through 5 illustrate a second shaft bearing arrangement that is generally similar in a functional sense to the system depicted in FIGS. 1 and 2. However, in the FIG. 3 system, the pressurized lubricant is introduced to the wedge film pump surface through a hole 49. The oil has a right-to-left motion through the bushing in addition to the desired circumferential motion.

In FIG. 3, the right portion of the bushing designated by numeral 31 is internally contoured to form the wedge film pump surface. The left portion of the bushing designated by numeral 35 has a cylindrical internal surface 36 having a uniform radial clearance relative to the shaft side surface. Oil discharged from the clearance 37 flows into an annular chamber 51 defined by the left end edge of the bushing and an annular lip seal 25. Seal 25 and end wall 19 form fluid barriers or confinement mechanisms for the oil circulated through the bushing.

As shown in FIGS. 4 and 5, the wedge film fluid pump surface portion 31 includes a fluid entrance surface 53 in the form of a groove or channel adapted to be spaced or recessed from the shaft surface, a ramp surface 55 extending from surface 53 and a land surface 57 axially and radially coextensive or coplanar with the bushing surface 36 defining the left portion of the bushing axial dimension. In the FIG. 3 arrangement, the wedge film pump surface is located within or forms an annular lubricant inlet chamber surrounding the shaft 10. Lubricant is introduced to the pump surface through hole 49.

As the shaft rotates around the shaft axis, oil is drawn circumferentially along the ramp surface 55 onto land surface 57. The pressurized condition of the rightmost chamber defined by the wedge film pump surface causes the oil to have a leftward motion across the bushing cylindrical surface 36. The shaft loading is supported on the oil film established on surfaces 36 and 57. The bearing system of FIG. 3 operates in approximately the same fashion as the system depicted in FIG. 1.

Figure 6:
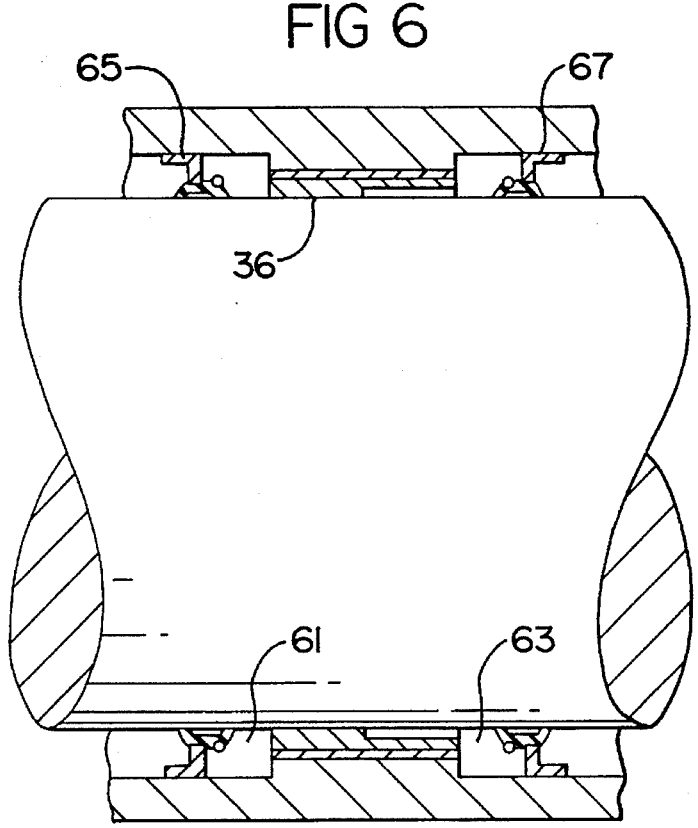
FIG. 6 is a view taken in the same direction as FIG. 1, illustrating a further embodiment of the invention.
Figures 7, 8:
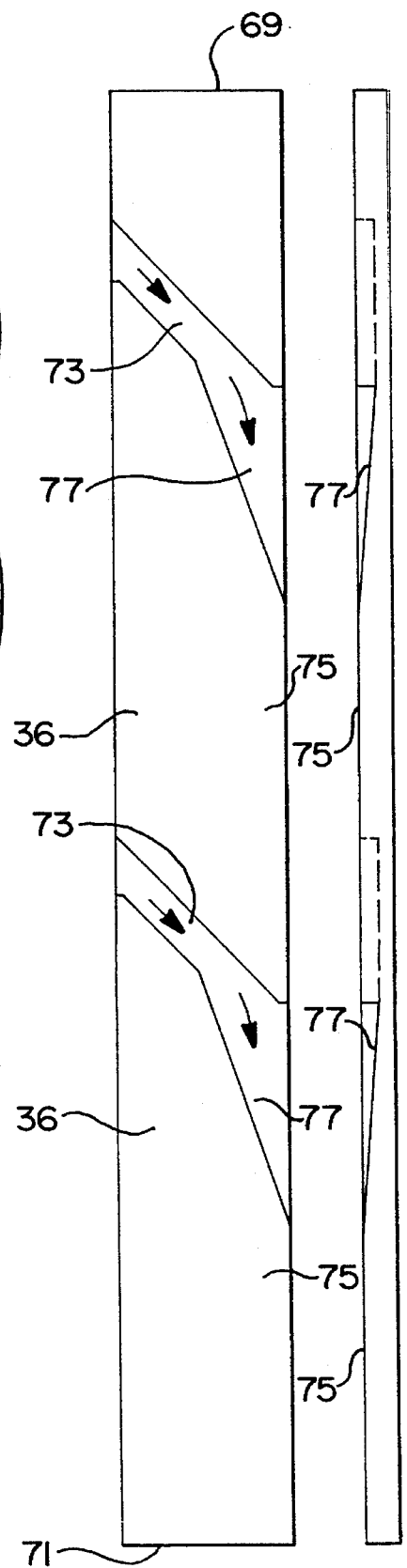
FIGS. 7 and 8 are views taken in the same directions as FIGS. 4 and 5, illustrating the FIG. 6 bearing.

FIGS. 6 through 8 show a shaft bearing system according to the invention designed to use a self-contained supply of lubricant, i.e. a bearing wherein there is no external lubricant source. In FIG. 6, the lubricant has two-directional flow through the bushing as determined by the relative pressures in two annular chambers 61 and 63 bordering the left and right edge portions of the bushing. Chambers 61 and 63 are defined by two fluid-confinement lip seals 65 and 67.

FIGS. 7 and 8 show the bushing unfolded to a flat condition. In the actual bushing, as depicted in FIG. 6, the axial edges 69 and 71 of the bushing wall are abutted and secured together to form an endless tubular bushing sleeve. The bushing has wedge film pump surfaces that define fluid entrance surfaces 73 which are spaced or recessed from the shaft surface 12 as shown in FIG. 6, land surfaces 75 extending axially and radially coplanar or coextensive with the inner bushing load support surface 36 and arcuate sloping ramp surfaces 77 joining surfaces 73 to land surfaces 75.

FIG. 7 includes arrows denoting the flow of lubricant 26 along surfaces 73, 77 and 75 during rotational motion of the shaft. The shaft circumferential motion draws the lubricant along ramp surfaces 77 onto land surfaces 75. The flow of oil along surface is 73 and 77 transfers oil from chamber 61 to chamber 63, thereby pressurizing chamber 63 while depressurizing chamber 61. A pressure differential is thus established tending to cause oil on bearing surface 36 to move in a right-to-left direction as shown in FIG. 6. An internal oil circuit is established across the bushing.

The bearing system of FIG. 7 operates in essentially the same fashion as the systems of FIGS. 1 and 3, except that the lubricant supply is self-contained, i.e. not remote from the shaft support.

Bearing systems of the present invention can be used at one or both ends of a rotary shaft, as shown in FIGS. 1 and 3. Also, such bearings can be used at intermediate points along a shaft, as shown in FIG. 6. When the bearing is supported at an end of the rotary shaft, the bearing advantageously adopts to orbital shaft motions of the shaft produced by transverse loadings at intermediate points along the shaft. In this case, the cylindrical bearing surface 36 is located closest to the end surface 14 of the shaft.

The continuous circumferential shaft support provided by the oil films on the cylindrical bearing surfaces 36 absorbs the multi-directional load forces sometime is associated with orbital shaft motions, i.e. minor cyclic motions of the shaft surface toward or away from the shaft axis. Surfaces 35 and 36 may be of differing axial length to suit a particular shaft load distribution.

The drawings show specific forms of the invention. However, it will be understood that the invention can be practiced in various forms.

What is claimed is:

1. A shaft and bushing assembly, comprising:

a rotary shaft having a cylindrical side surface;

a bushing encircling said shaft, said bushing having first and second axial end portions;

first fluid confinement means cooperable with the first end portion of said bushing to form a first annular lubricant chamber surrounding the shaft;

second fluid confinement means cooperable with the second end portion of said bushing to form a second annular lubricant chamber surrounding said shaft;

said bushing having an internal surface facing the cylindrical side surface of the shaft; the internal surface of said bushing comprising a cylindrical surface contiguous with said second end portion of the bushing, said cylindrical surface having a uniform radial clearance relative to the shaft surface; and the internal surface of said bushing further comprising a wedge film fluid pump surface contiguous with said first end portion of the bushing, whereby rotational motion of the shaft causes lubricant to be pumped from the first lubricant chamber across the fluid pump surface and onto the cylindrical surface of the bushing.

2. The shaft and bushing assembly of claim 1, wherein said wedge film fluid pump surface comprises a fluid entrance surface spaced from said shaft surface, a land surface coplanar with said cylindrical surface, and a ramp surface joining said fluid entrance surface and said land surface whereby the rotation of the shaft causes lubricant to be drawn along the ramp surface onto the land surface.

3. The shaft and bushing assembly of claim 1, wherein said bushing has an axial dimension defined as the axial distance between the bushing end portions; the cylindrical surface of said bushing having an axial dimension that is approximately three-quarters to one-half the axial dimension of the bushing.

4. The shaft and bushing assembly of claim 3, wherein said wedge film fluid pump surface has an axial dimension that is approximately one quarter to one-half the axial dimension of the bushing.

5. The shaft and bushing assembly of claim 1, wherein said shaft has an end surface normal to said cylindrical side surface; said bushing being spaced from the shaft end surface so that one of the fluid chambers is located between the shaft end surface and the bushing.

6. The shaft and bushing assembly of claim 1, wherein one of said fluid confinement means comprises an annular seal encircling the rotary shaft.

7. The shaft and bushing assembly of claim 1, and further comprising means for admitting pressurized lubricant to said first lubricant chamber; said admitting means comprising a radial hole extending through said bushing so as to communicate with said fluid entrance surface.

8. A shaft bushing comprising an annular steel backing layer laminated to an inner bearing alloy layer, said alloy layer comprising a contoured ramped surface portion extending axially from one axial end portion of said bushing toward an axial inner portion of said bushing and a first cylindrical surface portion extending from an opposed axial end portion of said bushing toward said axial inner portion of said bushing, said contoured ramped surface portion comprising a fluid entrance portion recessed with respect to said first cylindrical surface portion and extending circumferentially to a land surface, said land surface defining a second cylindrical surface portion which extends axially and radially coextensively with said first cylindrical surface portion.

\* \* \* \* \*